United States Patent
Tsukamoto (10) Patent No.: US 10,616,951 B2
(45) Date of Patent: Apr. 7, 2020

(54) TERMINAL DEVICE AND COMMUNICATION METHOD IN WHICH CHANNEL IS SHARED

(71) Applicant: JVC KENWOOD Corporation, Yokohama-shi, Kanagawa (JP)

(72) Inventor: Kazuya Tsukamoto, Yokohama (JP)

(73) Assignee: JVC KENWOOD CORPORATION, Yokohama-shi (JP)

(*) Notice: Subject to any disclaimer, the term of this patent is extended or adjusted under 35 U.S.C. 154(b) by 0 days.

(21) Appl. No.: 16/197,697

(22) Filed: Nov. 21, 2018

(65) Prior Publication Data
US 2019/0182892 A1  Jun. 13, 2019

(30) Foreign Application Priority Data
Dec. 11, 2017 (JP) .................................. 2017-237084

(51) Int. Cl.
H04W 76/45 (2018.01)
H04W 4/10 (2009.01)

(52) U.S. Cl.
CPC ............. *H04W 76/45* (2018.02); *H04W 4/10* (2013.01)

(58) Field of Classification Search
None
See application file for complete search history.

(56) References Cited

U.S. PATENT DOCUMENTS

| 2003/0235184 | A1* | 12/2003 | Dorenbosch | H04L 29/06 370/352 |
| 2007/0197248 | A1* | 8/2007 | Reich | H04W 4/10 455/518 |
| 2010/0260038 | A1* | 10/2010 | Dhodapkar | H04W 76/45 370/216 |
| 2018/0242120 | A1* | 8/2018 | Baek | H04L 12/18 |

FOREIGN PATENT DOCUMENTS

JP  2001-285485 A  10/2001

* cited by examiner

*Primary Examiner* — Alejandro Rivero
(74) *Attorney, Agent, or Firm* — Brundidge & Stanger, P.C.

(57) ABSTRACT

A detector detects communication from a transmitting terminal device to a receiving terminal device on a given channel. A storage stores information on the transmitting terminal device and the receiving terminal device when the detector detects the communication. A requesting unit requests the transmitting terminal device for an interruption in the communication when the detector detects the communication. A communication unit performs interrupting communication on the given channel when the transmitting terminal device stops the communication on the given channel in response to the request by the requesting unit. An invitation unit prompts the transmitting terminal device and the receiving terminal device to resume the communication on the given channel based on the information stored in the storage, when the communication unit terminates the interrupting communication.

5 Claims, 6 Drawing Sheets

TERMINAL DEVICE AND COMMUNICATION METHOD IN WHICH CHANNEL IS SHARED

CROSS-REFERENCE TO RELATED APPLICATION

This application is based upon and claims the benefit of priority from the prior Japanese Patent Application No. 2017-237084, filed on Dec. 11, 2017, the entire contents of which is incorporated herein by reference.

BACKGROUND

1. Field

The present invention relates to communication technology and, more particularly, to a terminal device and a communication method in which a channel is shared for use.

2. Description of the Related Art

Call waiting service is designed to send a predetermined notification signal to a telephone line on which a call of a user is proceeding when an incoming call from a further user occurs on the telephone line, so as to notify the user of an incoming interrupting call. More specifically, when an incoming interrupting call occurs on a telephone line on which a call to the first handset is proceeding, a button telephone set suspends the call by the first handset and forms an interrupting call by the second handset using the telephone line. In such a service, a smooth transition from the termination of the interrupting call to the re-formation of the original call that does not require a complicated user operation is called for. For this purpose, a button telephone set gives a notification of the termination of an interrupting call by calling the first handset in response to the termination of the interrupting call (see, for example, patent document 1).

[patent document 1] JP2001-285485

A terminal device compatible with push-to-talk (PTT) is provided with a PTT switch. The state of the terminal device is switched between transmission and reception in response to an on-off operation of the PTT switch. For example, the terminal device is in a state of transmission while the PTT switch is being pressed. When the PTT switch is released, the terminal device returns to a state of reception. In a wireless communication system including such a terminal device, a plurality of communication sessions are shared on a single channel. Therefore, when a set of terminal devices are communicating by using a single channel, another set of terminal devices cannot start communication until the communication is terminated. Meanwhile, interrupting communication defined in a wireless communication system allows communication between one pair of terminal devices to be stopped and allows communication between a further pair of terminal devices to take place. When communication between the further terminal devices is terminated, the one pair of terminal devices compete with other terminal devices for one channel. If the one pair of terminal devices can secure the one channel, they can resume communication. If the one pair of terminal devices cannot secure the one channel, they cannot resume communication so that efficient communication is impeded.

SUMMARY

A terminal device according to an embodiment includes: a detector that detects communication from a transmitting terminal device to a receiving terminal device on a given channel; a storage that stores information on the transmitting terminal device and the receiving terminal device when the detector detects the communication; a requesting unit that requests the transmitting terminal device for an interruption in the communication when the detector detects the communication; a communication unit that performs interrupting communication on the given channel when the transmitting terminal device stops the communication on the given channel in response to the request by the requesting unit; and an invitation unit that prompts the transmitting terminal device and the receiving terminal device to resume the communication on the given channel based on the information stored in the storage, when the communication unit terminates the interrupting communication.

A terminal device may include: a communication unit that performs communication on a given channel; and a detector that, when the communication unit stops communication on a given channel in response to a request from a further terminal device for an interruption in the communication and then the further terminal device terminates interrupting communication, detects a signal to prompt the terminal device to resume the communication on the given channel. The communication unit can communicate on the given channel while the detector detects the signal to prompt the terminal device to resume the communication.

Another embodiment relates to a communication method. The method includes: detecting communication from a transmitting terminal device to a receiving terminal device on a given channel; storing information on the transmitting terminal device and the receiving terminal device when the communication is detected; requesting the transmitting terminal device for an interruption in the communication when the communication is detected; performs interrupting communication on the given channel when the transmitting terminal device stops the communication on the given channel in response to the request; and prompting the transmitting terminal device and the receiving terminal device to resume the communication on the given channel based on the information stored, when the interrupting communication is terminated.

Still another embodiment also relates to a communication method. The method includes: performing communication on a given channel; when the communication unit on a given channel is stopped in response to a request from a further terminal device for an interruption in the communication and then the further terminal device terminates interrupting communication, detecting a signal from the further terminal device to prompt the communication on the given channel to be stopped; enabling the communication on the given channel while the signal to prompt the communication to be resumed is being detected.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION

The invention will now be described by reference to the preferred embodiments. This does not intend to limit the scope of the present invention, but to exemplify the invention.

A summary of the present invention will be given before describing the invention in specific detail. An embodiment relates to a terminal device configured to transmit a speech signal when a PTT button (PTT switch) is pressed down and receive a speech signal when the PTT button is not pressed down. For example, the terminal device is included in a business wireless system. In a business wireless system, frames are arranged on a time axis in a given frequency channel. Each frame is divided into a plurality of slots. A channel is formed by combining slots in the respective frames having the same relative sequence number. For example, a channel is formed by securing, for each frame, the second slot from the start of the frame. A plurality of calls share a channel. It is assumed that a call is made directly between terminal devices. One-to-one call or one-to-N call may be made. The latter represents group communication.

When one pair of terminal devices are communicating by using one channel, another pair of terminal devices cannot start communication until the communication is terminated. An interrupting call is defined to prioritize a call between the other pair of terminal devices that is highly urgent. An interrupting call terminates the call between the one pair of terminal devices and initiates a call between the other pair of terminal devices in the channel that is made available. When the call between the other terminal devices is completed, the channel is made available again. However, the one pair of terminal devices that were interrupted have to compete with other terminal devices for the one channel in order to resume the previous call. The one pair of terminal devices can resume communication if they are successful in acquiring the one channel. If the terminal devices cannot acquire the one channel, they cannot resume the communication.

To realize efficient communication in the one pair of interrupted terminal devices, it is desired to allow the one pair of interrupted terminal devices to use the one channel preferentially when the call between the other interrupting terminal devices is terminated. For this purpose, the terminal device according to this embodiment (for example, the interrupting terminal device) receives a speech signal communicated in the call and acquires information related to the call. For example, the interrupting terminal device acquires the ID of the transmitting terminal device and the ID of the receiving terminal device. The interrupting terminal device also transmits an invitation signal to the terminal devices respectively having the acquired IDs when the interrupting call is completed so as to prompt the terminals to resume the call. The terminal devices identified by the invitation signal can resume the call while the invitation signal is being received. The terminal devices not identified by the invitation signal cannot resume the call while the invitation signal is being received. Consequently, the interrupted terminal device can resume the call preferentially.

Figure 1A:
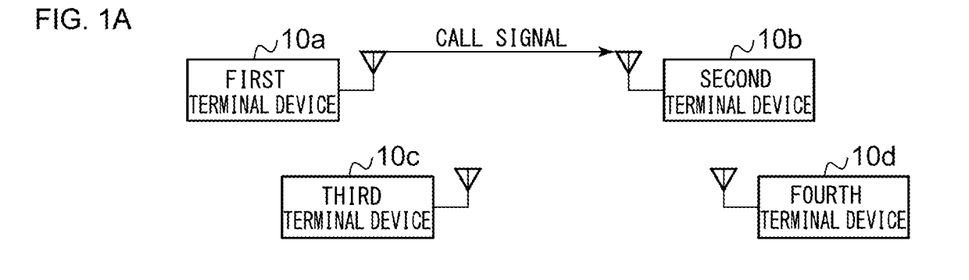
FIGS. 1A-1D show an outline of the operation of the communication system according to an embodiment.

FIGS. 1A-1D show an outline of the operation of the communication system 100. The communication system 100 includes a first terminal device 10a, a second terminal device 10b, a third terminal device 10c, and a fourth terminal device 10d, which are generically referred to as terminal devices 10. The number of terminal devices 10 included in the communication system 100 is not limited to "4". Referring to FIG. 1A, the first terminal device 10a transmits a call signal including a speech signal on a given channel as the PTT button in the first terminal device 10a is pressed down. In other words, the first terminal device 10a is a terminal device 10 used by the caller. The second terminal device 10b receives the call signal from the first terminal device 10a on the channel used by the first terminal device 10a. The second terminal device 10b plays back the speech signal included in the call signal. In other words, the second terminal device 10b is a terminal device 10 used by the call receiver. Thus, a call is made from the first terminal device 10a to the second terminal device 10b in the form of communication using a given channel. In this case, one-to-one call takes place. Alternatively, one-to-N call may take place by receiving the call signal from the first terminal device 10a by a plurality of terminal devices 10.

The third terminal device 10c is a terminal device 10 not included in the call between the first terminal device 10a and the second terminal device 10b. The third terminal device 10c requests a call to be made by using the channel used for the call between the first terminal device 10a and the second terminal device 10b. The third terminal device 10c receives the call signal from the first terminal device 10a and acquires the ID of the first terminal device 10a and the ID of the second terminal device 10b included in the call signal. This allows the third terminal device 10c to recognize that the call between the first terminal device 10a and the second terminal device 10b is proceeding on the given channel.

Figure 1B:
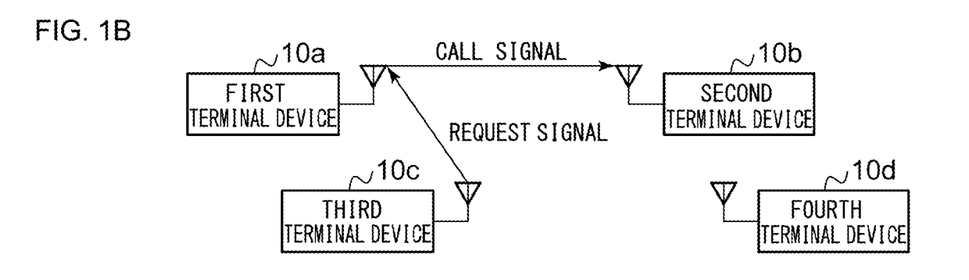
Figure 1C:
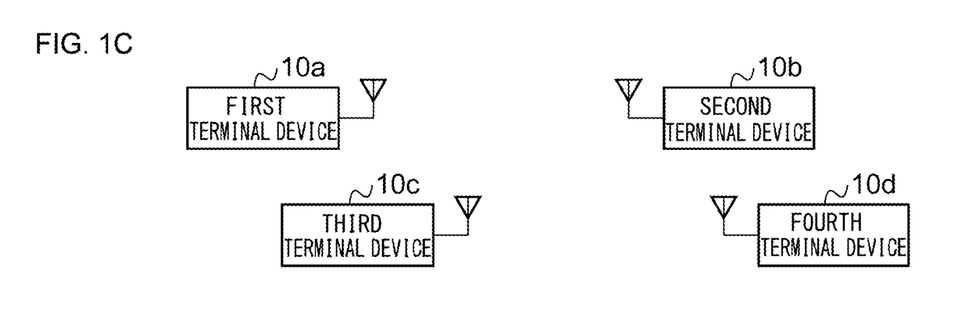

Referring to FIG. 1B, the third terminal device 10c transmits an interruption request signal to the first terminal device 10a representing the caller. The request signal is a signal to request the first terminal device 10a to stop the call on the given channel, i.e., stop the transmission of a call signal. Upon receiving the request signal, the first terminal device 10a stops the transmission of a call signal as shown in FIG. 1C. This is equivalent to the call from the first terminal device 10a to the second terminal device 10b being stopped by the interruption by the third terminal device 10c. The third terminal device 10c confirms that the transmission of a call signal from the first terminal device 10a on the given channel is stopped.

Figure 1D:
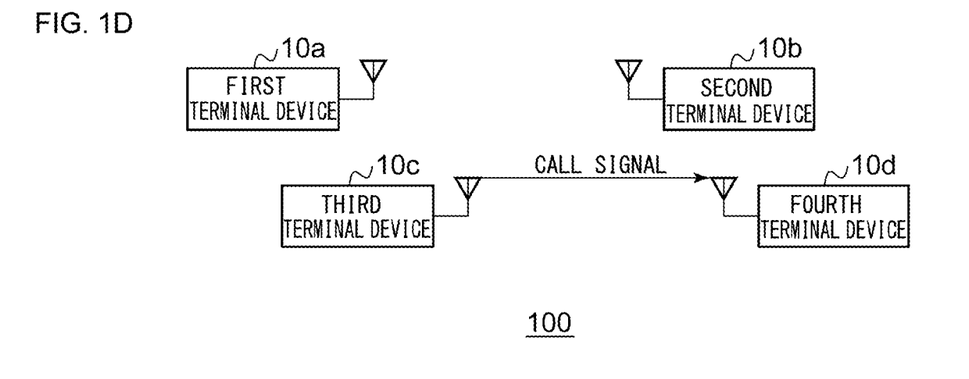

Referring to FIG. 1D, the third terminal device 10c transmits a call signal to the fourth terminal device 10d on the channel in which the first terminal device 10a is interrupted. The fourth terminal device 10d receives the call signal from the third terminal device 10c on the channel used by the third terminal device 10c. The fourth terminal device 10d plays back the speech signal included in the call signal. In other words, the third terminal device 10c and the fourth terminal device 10d start an interrupting call by performing a similar process to that previously performed by the first terminal device 10a and the second terminal device 10b. The third terminal device 10c stores the ID of the first terminal device 10*a* and the ID of the second terminal device 10*b* that had made the interrupted call.

Figure 2A:
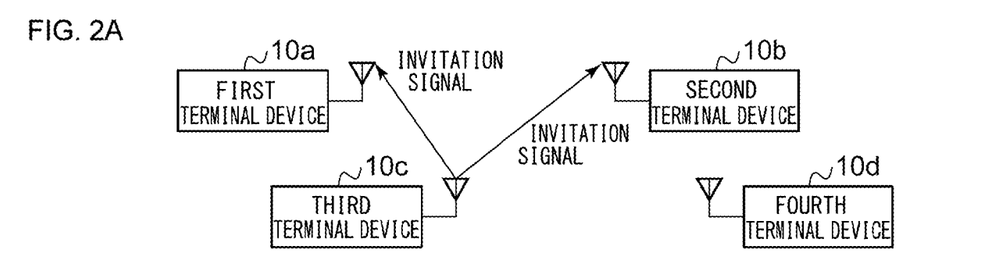
FIGS. 2A-2C show an outline of the subsequent operation in the communication system according to the embodiment.
Figure 2B:
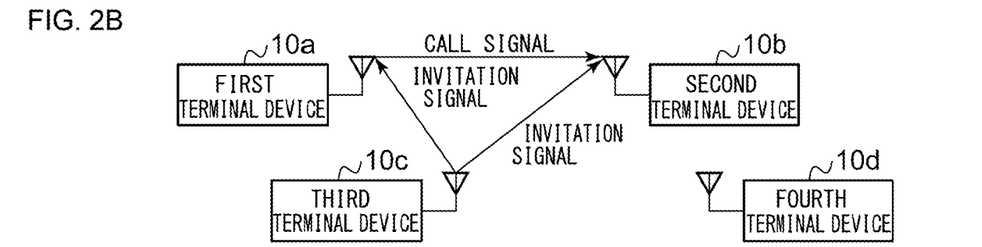
Figure 2C:
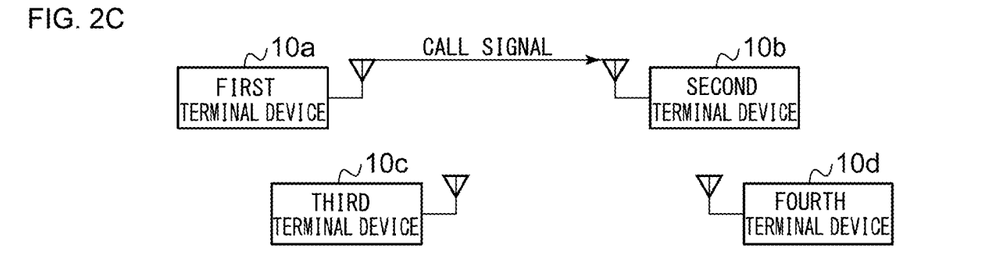

FIGS. 2A-2C show an outline of the subsequent operation in the communication system 100. When the interrupting call between the third terminal device 10*c* and the fourth terminal device 10*d* is terminated, the third terminal device 10*c* transmits an invitation call to the first terminal device 10*a* and the second terminal device 10*b* as shown in FIG. 2A. The invitation signal is a signal to prompt the terminal devices 10 that had made the interrupted call to resume the call and is transmitted for a predetermined period of time. As described above, the ID of the first terminal device 10*a* and the ID of the second terminal device 10*b* stored are used as the destination of the invitation signal. By receiving the invitation signal, the first terminal device 10*a* and the second terminal device 10*b* recognize that the interrupted channel is made available again.

When the PTT switch in the first terminal device 10*a* is pressed down while the first terminal device 10*a* and the second terminal device 10*b* are receiving the invitation signal as shown in FIG. 2B, the first terminal device 10*a* acquires the interrupted channel and transmits a call signal to the second terminal device 10*b*. The result is shown in FIG. 2C. When the PTT switch in the second terminal device 10*b* is pressed down while the invitation signal is being received, the second terminal device 10*b* acquires the interrupted channel and transmits a call signal to the first terminal device 10*a*. The terminal devices 10*c* (not shown) other than the first terminal device 10*a* and the second terminal device 10*b* cannot acquire the aforementioned channel or transmit a call signal even if the PTT switch is pressed down while the call signal from the third terminal device 10*c* is being received.

Figure 3:
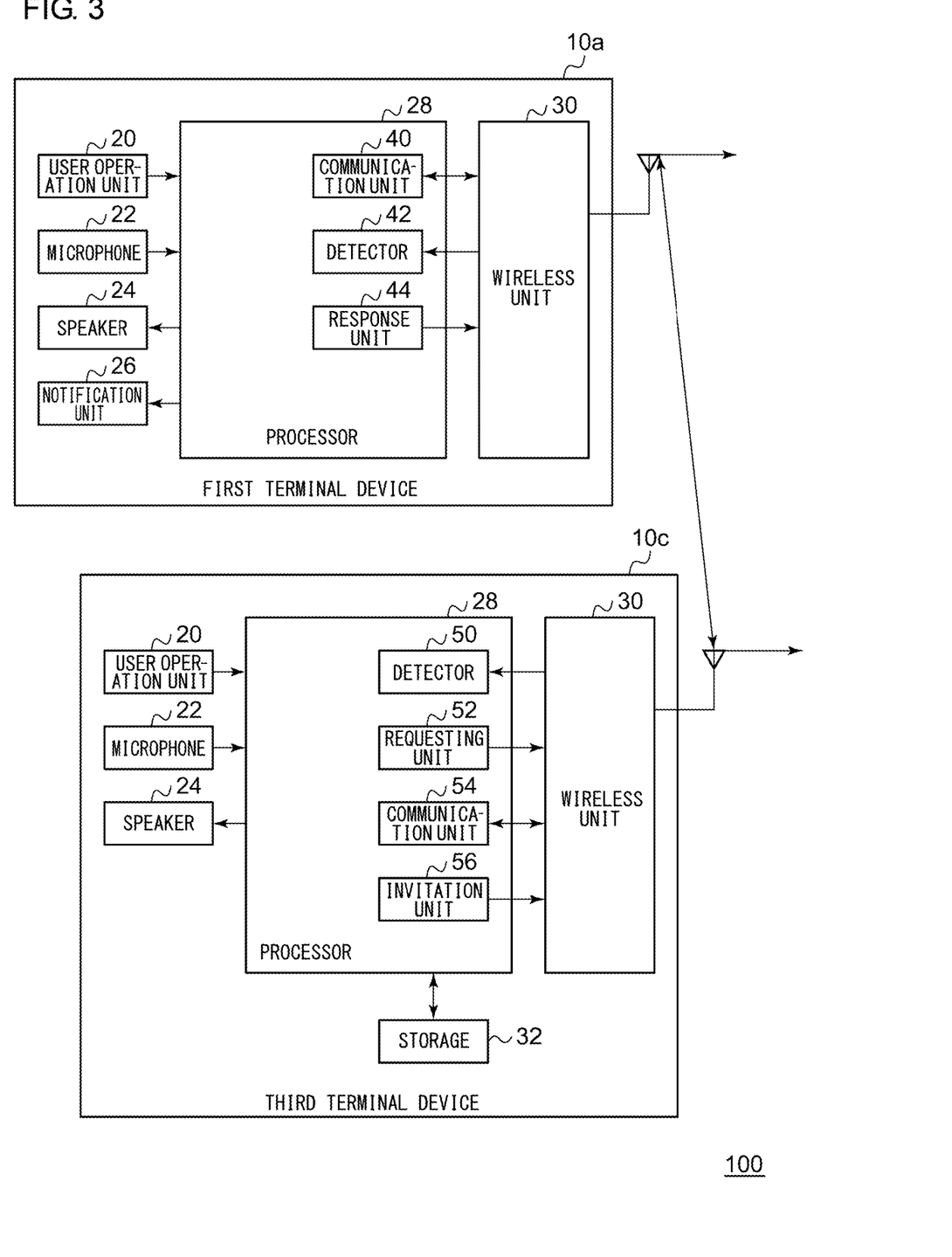
FIG. 3 shows a configuration of the terminal device shown in FIGS. 1A-1D and FIGS. 2A-2C.

FIG. 3 shows a configuration of the first terminal device 10*a* and the third terminal device 10*c*. The first terminal device 10*a* includes a user operation unit 20, a microphone 22, a speaker 24, a notification unit 26, a processor 28, and a wireless unit 30. The processor 28 includes a communication unit 40, a detector 42, and a response unit 44. The third terminal device 10*c* includes a user operation unit 20, a microphone 22, a speaker 24, a processor 28, a wireless unit 30, and a storage 32. The processor 28 includes a detector 50, a requesting unit 52, a communication unit 54, and an invitation unit 56. The first terminal device 10*a* and the third terminal device 10*c* have the same configuration. FIG. 3 also shows a configuration of the interrupted first terminal device 10*a* and the interrupting third terminal device 10*c* as they are depicted in FIGS. 1A-1D and FIGS. 2A-2C. (1) Making of the initial call, (2) making of an interrupting call, and (3) return to the initial call will be described in the stated order below.

(1) Making of the Initial Call

The initial call is a call from the first terminal device 10*a* to the second terminal device 10*b* on a given channel and is depicted in FIG. 1A. The user operation unit 20 of the first terminal device 10*a* is, for example, the PTT button and is pressed down to transmit a call signal. Meanwhile, the user operation unit 20 is not pressed down when a call signal is not transmitted. The processor 28 is connected to the user operation unit 20 and detects that the user operation unit 20 is pressed down. The processor 28 controls the process in the first terminal device 10*a* based on a result of detection. The microphone 22 receives a speech originated by the user. The microphone 22 converts the speech into an electrical signal and outputs the speech in the electrical signal (hereinafter, also referred to as "speech") to the processor 28. The processor 28 receives the speech from the microphone 22. The processor 28 generates a speech signal by subjecting the speech to a process such as encoding.

The communication unit 40 generates a call signal including the speech signal generated by the processor 28. The call signal includes the ID of the first terminal device 10*a* originating the call signal and the ID of the second terminal device 10*b* shown in FIGS. 1A-1B to which the call signal is directed. The communication unit 40 outputs the call signal to the wireless unit 30. The wireless unit 30 is capable of performing a process compatible with a wireless communication system such as a business wireless system. When the call signal from the communication unit 40 is received, the wireless unit 30 transmits a call signal on a given channel secured by competing with other terminal devices 10. For securing of a given channel, a publicly known technology may be used so that a description thereof is omitted.

The second terminal device 10*b* of FIGS. 1A-1B is configured like the first terminal device 10*a*. The wireless unit 30 of the second terminal device 10*b* receives the call signal from the first terminal device 10*a* on the given channel. The wireless unit 30 outputs the received call signal to the communication unit 40. The communication unit 40 extracts the speech signal from the call signal and extracts the ID of the terminal device 10 to which the speech signal is directed. When the extracted ID is that of the local device, the communication unit 40 outputs the speech signal to the processor 28. Thus, the communication unit 40 performs communication on the given channel, and, in particular, makes a call. The processor 28 acquires the speech by subjecting the speech signal to a process such as decoding. The processor 28 plays back the speech and outputs the speech to the speaker 24. The speaker 24 outputs the speech outside.

(2) Making of an Interrupting Call

The interrupting call is a call made from the third terminal device 10*c* to the fourth terminal device 10*d*, instead of the first terminal device 10*a* and the second terminal device 10*b*, on the channel used in the initial call and is depicted in FIGS. 1B-1D. The user operation unit 20 of the third terminal device 10*c* is a button to make an urgent call. Like the PTT button, this button is pressed down to transmit a call signal. This button may be provided separate from the PTT button or may be identical to the PTT button. The processor 28 is connected to the user operation unit 20 and detects that the user operation unit 20 is pressed down.

When the processor 28 detects that the user operation unit 20 is pressed down, the detector 50 acquires the call signal received by the wireless unit 30. The wireless unit 30 receives the call signal on the channel used by the first terminal device 10*a* and the second terminal device 10*b*. The detector 50 extracts the ID of the transmitting terminal device 10 and the ID of the destination terminal device 10 from the acquired call signal. This is equivalent to detecting communication from the first terminal device 10*a* to the second terminal device 10*b* on the given channel. Given that the first terminal device 10*a* is referred to as the transmitting terminal device, the second terminal device 10*b* will be referred to as the receiving terminal device. The detector 50 stores the two IDs extracted to the storage 32 via the processor 28. The storage 32 stores the ID of the first terminal device 10*a* and the ID of the second terminal device 10*b* detected by the detector 50.

When the storage 32 stores the IDs, the requesting unit 52 generates a request signal to request the first terminal device 10*a* for interruption in the call. The request signal includes the ID of the first terminal device 10*a*. The requesting unit 52 outputs the request signal to the wireless unit 30. The wireless unit 30 transmits the request signal at a point of time when the call signal on the given channel is not transmitted. The wireless unit 30 may transmit the request signal in slots on the frequency channel including the given channel that are different from those of the given channel.

The wireless unit 30 of the first terminal device 10a receives the request signal from the third terminal device 10c. The wireless unit 30 outputs the request signal to the detector 42. When the ID included in the request signal is the ID of the device itself, the detector 42 detects that interruption in the call is requested from the third terminal device 10c. When the detector 42 detects that an interruption is requested, the processor 28 causes the communication unit 40 and the wireless unit 30 to stop the call on the given channel. In response, the communication unit 40 and the wireless unit 30 stop the call on the given channel, i.e., stops the transmission of a call signal. In this way, the call between the first terminal device 10a and the second terminal device 10b using the given channel is stopped.

The wireless unit 30 of the third terminal device 10c monitors the channel used for the call between the first terminal device 10a and the second terminal device 10b. The processor 28 detects that a call signal from the first terminal device 10a has not been received for a predetermined period of time by referring to a result of monitoring by the wireless unit 30. This is equivalent to detecting that the first terminal device 10a has stopped the transmission of a call signal on the given channel in response to the request by the requesting unit 52. In response, the processor 28 determines to transmit a call signal, i.e., to start an interrupting call.

The user operation unit 20 is pressed down, and the processor 28 detects that the user operation unit 20 is pressed down. The microphone 22 receives a speech originated by the user. The processor 28 receives the speech from the microphone 22 and generates a speech signal from the speech. The communication unit 54 generates a call signal including the speech signal generated by the processor 28. The call signal also includes the ID of the third terminal device 10c originating the call signal and the ID of the fourth terminal device 10d shown in FIG. 1D to which the call signal is directed. The communication unit 54 outputs the call signal to the wireless unit 30. The wireless unit 30 transmits the call signal on the given channel. In this way, the communication unit 54 makes a call on the given channel when the initial call is stopped.

(3) Return to the Initial Call

When the interrupting call is terminated, i.e., when the transmission of a call signal is stopped, the communication unit 54 of the third terminal device 10c notifies invitation unit 56 of the termination of the interrupting call. When the notification from the communication unit 54 is received, the invitation unit 56 acquires the two IDs stored in the storage 32. The two IDs are the ID of the first terminal device 10a and the ID of the second terminal device 10b. The invitation unit 56 generates an invitation signal to include the two IDs acquired. The invitation signal is a signal that prompts the first terminal device 10a and the second terminal device 10b to resume communication on the given channel. The invitation unit 56 outputs the invitation signal to the wireless unit 30. The wireless unit 30 transmits the invitation signal on the given channel. The invitation signal is transmitted to the first terminal device 10a and the second terminal device 10c for a predetermined period of time since the communication unit 54 terminated communication. This is depicted in FIG. 2A.

The wireless unit 30 of the first terminal device 10a receives the invitation signal on the given channel. The wireless unit 30 outputs the invitation signal to the detector 42. When the ID included in the invitation signal is the ID of the host device, the detector 42 detects the acquisition of the invitation signal. This prompts the device to resume the call on the given channel. Upon detecting the acquisition of the invitation signal, the detector 42 causes the notification unit 26 to indicate that the device is prompted to resume the call.

The notification unit 26 is implemented by, for example, a light emitting diode (LED) and is lighted or flashes in accordance with an instruction from the detector 42. Alternatively, the notification unit 26 may be a liquid crystal display (LCD) and may display information to indicate that the device is prompted to resume the call in accordance with an instruction from the detector 42. The notification unit 26 may be a speaker and may output a beep sound etc. in accordance with an instruction from the detector 42. Still alternatively, the notification unit 26 may be a vibrator and may be vibrated in accordance with an instruction from the detector 42. Thus, the notification unit 26 notifies the user that the device is prompted to resume the call.

While a notification is being given by the notification unit 26, the communication unit 40 can make a call on the given channel as the user presses down the user operation unit 20. The interval during which a notification is given by the notification unit 26 is equivalent to the interval during which the detector 42 detects the acquisition of the invitation signal or the interval during which the detector 42 detects that the terminal device is prompted to resume the call. When the user presses down the user operation unit 20, the wireless unit 30 secures the aforementioned given channel and transmits a call signal as already discussed. This is equivalent to securing the given channel preferentially while the invitation signal from the third terminal device 10c is being transmitted. This depicted in FIGS. 2A-2C.

Meanwhile, when the detector 42 no longer detects the acquisition of the invitation signal, i.e., the transmission of the invitation signal from the third terminal device 10c is stopped, the given channel is not secured preferentially. In this instance, a notification is not given by the notification unit 26. This is equivalent to the case where the device is not prompted to resume the call. When the user operation unit 20 of the first terminal device 10a is pressed down in this situation, the wireless unit 30 secures the given channel by competing with other terminal devices 10 as in the case of (1).

Meanwhile, the resumption of the call may not be necessary even when a notification is given by the notification unit 26. In this case, the user may use the user operation unit 20 to indicate that the resumption of the call is not necessary. Upon receiving an instruction indicating that resumption is unnecessary from the user operation unit 20, the processor 28 outputs the instruction to the response unit 44. Upon receiving the instruction from the processor 28, i.e., when it is not necessary to resume the call even if the detector 42 is prompting the device to resume the call, the response unit 44 outputs a rejection signal indicating rejection of resumption to the wireless unit 30. The wireless unit 30 transmits the rejection signal to the third terminal device 10c. The wireless unit 30 transmits the rejection signal to the third terminal device 10c at a point of time when the invitation signal on the given channel is not being transmitted. The wireless unit 30 may transmit the rejection signal in slots on the frequency channel including the given channel that are different from those of the given channel.

Upon receiving the rejection signal, the wireless unit 30 of the third terminal device 10c outputs the rejection signal to the invitation unit 56. Upon receiving the rejection signal, the invitation unit 56 causes the wireless unit 30 to stop the transmission of the invitation signal. After the third terminal device 10c stops the transmission of the invitation signal, all terminal devices 10 can use the channel freely.

A call made from the third terminal device 10c to the fourth terminal device 10d is described above as an example of an interrupting call made after the third terminal device 10c transmits the request signal to the first terminal device 10a. The interrupting call is not limited to a call made from the third terminal device 10c to the fourth terminal device 10d but may be a call made to other terminal devices including the first terminal device 10a.

The features are implemented in hardware such as a CPU, a memory, or other LSI's, of any computer and in software such as a program loaded into a memory. The figure depicts functional blocks implemented by the cooperation of these elements. Therefore, it will be understood by those skilled in the art that the functional blocks may be implemented in a variety of manners by hardware only or by a combination of hardware and software.

Figure 4:
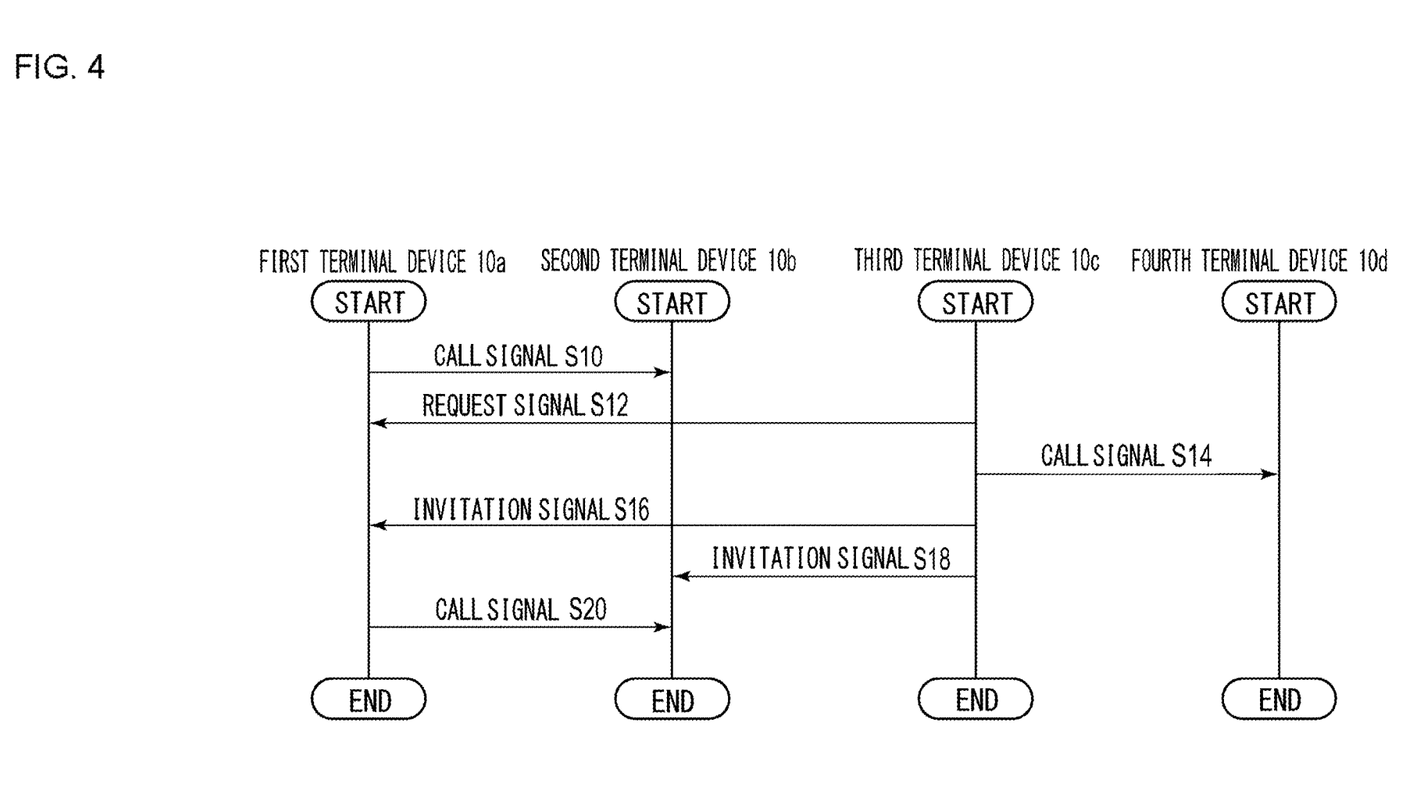
FIG. 4 is a sequence chart showing steps for communication performed by the communication system shown in FIGS. 1A-1D and FIGS. 2A-2C.

A description will be given of the operation of the communication system 100 having the above configuration. FIG. 4 is a sequence chart showing steps for communication performed by the communication system 100. The first terminal device 10a transmits a call signal to the second terminal device 10b (S10). The third terminal device 10c transmits a request signal to the first terminal device 10a (S12). The third terminal device 10c transmits a call signal to the fourth terminal device 10d (S14). The third terminal device 10c transmits an invitation signal to the first terminal device 10a and the second terminal device 10b (S16, S18). The first terminal device 10a transmits a call signal to the second terminal device 10b (S20).

Figure 5:
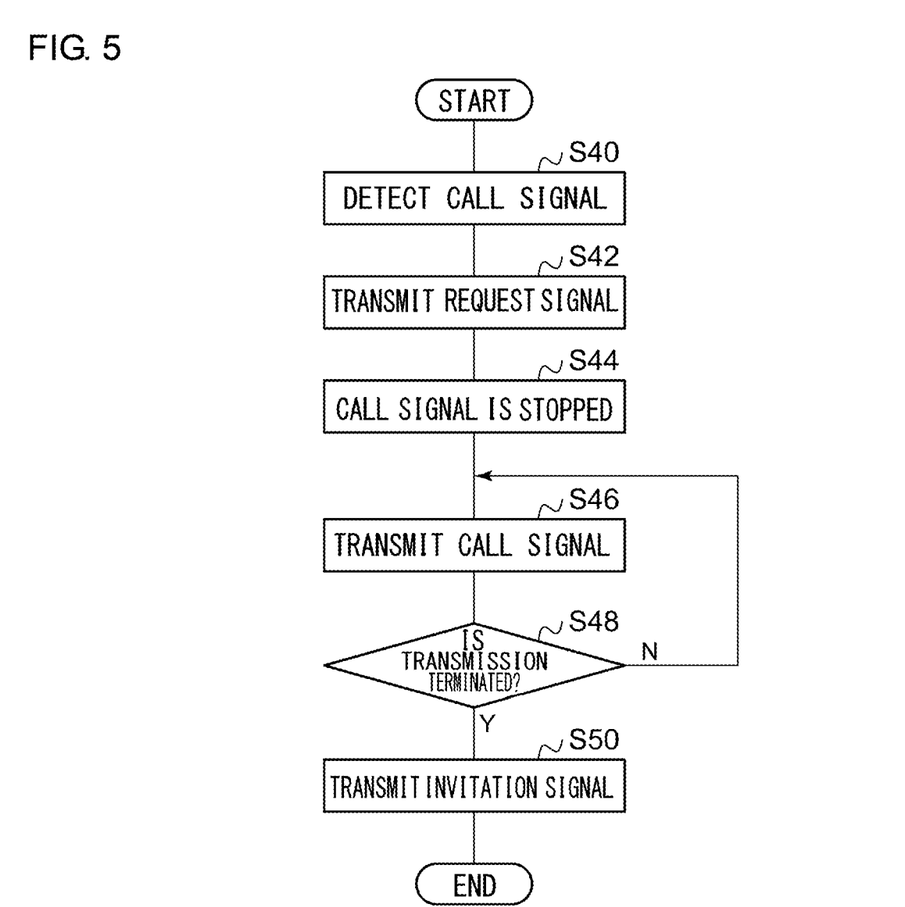
FIG. 5 is a flowchart showing steps for communication performed by the third terminal device shown in FIGS. 1A-1D and FIGS. 2A-2C.

FIG. 5 is a flowchart showing steps for communication performed by the third terminal device 10c. The detector 50 detects a call signal from the first terminal device 10a (S40). Further, the ID of the first terminal device 10a and the ID of the second terminal device 10b included in the call signal are stored in the storage 32. The requesting unit 52 transmits a request signal to the first terminal device 10a (S42). When the wireless unit 30 detects that the call signal from the first terminal device 10a is stopped (S44), the communication unit 54 transmits a call signal to the fourth terminal device 10d (S46). When the transmission is not terminated (N in S48), control is returned to step S46. When the transmission is terminated (Y in S48), the invitation unit 56 transmits the invitation signal to the first terminal device 10a and the second terminal device 10b for a predetermined period of time (S50).

Figure 6:
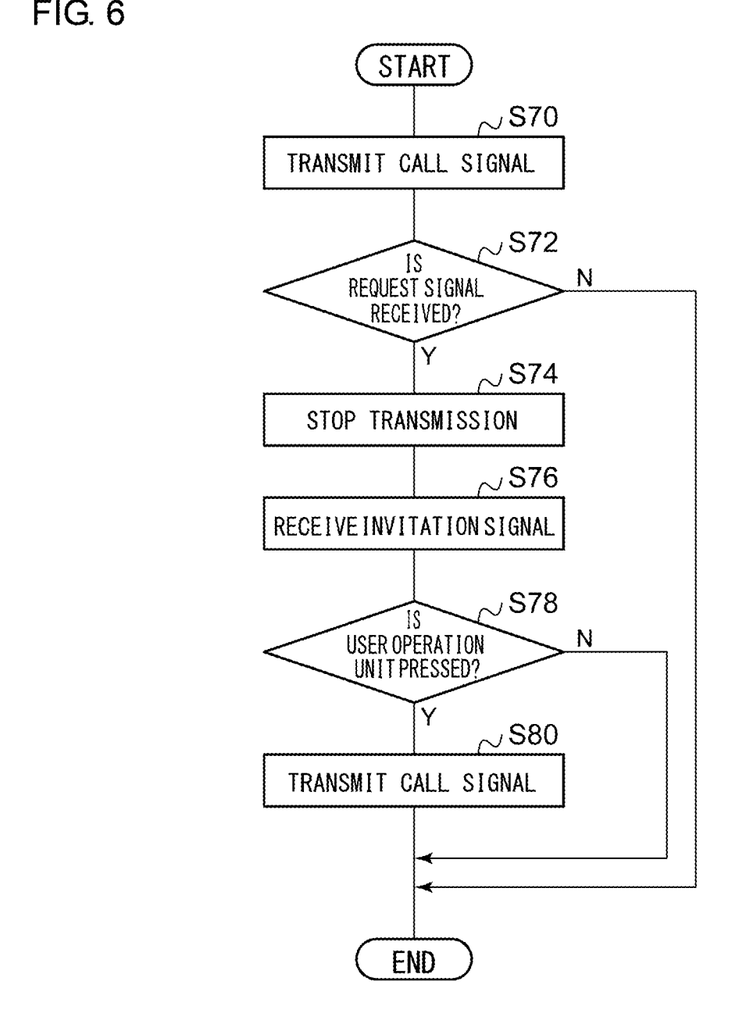
FIG. 6 is a flowchart showing steps for communication performed by the first terminal device shown in FIGS. 1A-1D and FIGS. 2A-2C.

FIG. 6 is a flowchart showing steps for communication performed by the first terminal device 10a. The communication unit 40 transmits a call signal to the second terminal device 10b (S70). When the detector 42 detects the reception of a request signal from the third terminal device 10c (Y in S72), the communication unit 40 stops transmitting a call signal (S74). The detector 42 detects the reception of an invitation signal from the third terminal device 10c (S76). When the user operation unit 20 is pressed down (Y in S78), the communication unit 40 transmits a call signal to the second terminal device 10b (S80). When the user operation unit 20 is not pressed down (N in S78), the process is terminated. Further, when the detector 42 does not detect the reception of a request signal from the third terminal device 10c (N in S72), the process is terminated.

According to the embodiment, when a call interrupting a call between a transmitting terminal device and a receiving terminal device is terminated, an invitation signal to prompt the devices to resume the call is transmitted to the transmitting terminal device and the receiving terminal device. Therefore, the interrupted call can be resumed preferentially. Since the interrupted call is resumed preferentially, it is easy to resume the interrupted call. Further, an invitation signal is transmitted for a predetermined period of time after the call is terminated, the period of time during which the interrupted call is resumed preferentially is limited. Further, since the period of time during which the interrupted call is resumed preferentially is limited, the impact on terminal devices other than the terminal devices for which the call is interrupted is reduced.

Since a call on the given channel can be made for a period of time during which the invitation signal to prompt the devices to resume the call on the given channel is being received, the interrupted call is resumed preferentially. Since a notification is given to indicate that the invitation signal is being received, the user can be notified of a point of time when the interrupted call can be resumed. When it is not necessary to resume the communication even when the invitation signal is received, a rejection signal to reject the resumption is transmitted. The terminal transmitting the invitation signal receives the rejection signal and stops the transmission of the invitation signal. Therefore, the impact on terminal devices other than the terminal devices for which the call is interrupted is reduced.

Described above is an explanation based on an exemplary embodiment. The embodiment is intended to be illustrative only and it will be understood by those skilled in the art that various modifications to constituting elements and processes could be developed and that such modifications are also within the scope of the present invention.

According to embodiments 1, 2, the business wireless system is used in the communication system 100. The type of system is non-limiting, and a wireless communication system other than the business wireless system, such as a cellular phone system, may be used. According to this variation, the flexibility of the system is improved.

What is claimed is:

1. A terminal device comprising:
   a detector that detects communication from a transmitting terminal device to a receiving terminal device on a given channel;
   a storage that stores information on the transmitting terminal device and the receiving terminal device when the detector detects the communication;
   a requesting unit that requests the transmitting terminal device for an interruption in the communication when the detector detects the communication;
   a communication unit that performs interrupting communication on the given channel when the transmitting terminal device stops the communication on the given channel in response to the request by the requesting unit; and
   an invitation unit that prompts the transmitting terminal device and the receiving terminal device to resume the communication on the given channel based on the information stored in the storage, when the communication unit terminates the interrupting communication,
   wherein the invitation unit transmits a signal to prompt the transmitting terminal device and the receiving terminal device to resume the communication, for a predetermined period of time since the communication unit terminates the communication, and wherein the invitation unit stops the transmission of a signal to prompt the transmitting terminal and the receiving terminal to resume the communication when a signal to reject resumption of the communication is received from the transmitting terminal device.

2. A terminal device comprising:

a communication unit that performs communication on a given channel;

a detector that, when the communication unit stops communication on a given channel in response to a request from a further terminal device for an interruption in the communication and then the further terminal device terminates interrupting communication, detects a signal to prompt the terminal device to resume the communication on the given channel; and a response unit that notifies the further terminal device of rejection of resumption even when the signal to prompt the terminal device to resume the communication is detected by the detector, wherein the communication unit is configured to communicate on the given channel while the detector detects the signal to prompt the terminal device to resume the communication.

3. The terminal device according to claim 2, further comprising:

a notification unit that gives a notification to indicate that the terminal device is prompted in the detector to resume the communication.

4. A communication method comprising:

detecting communication from a transmitting terminal device to a receiving terminal device on a given channel;

storing information on the transmitting terminal device and the receiving terminal device when the communication is detected;

requesting the transmitting terminal device for an interruption in the communication when the communication is detected;

performing interrupting communication on the given channel when the transmitting terminal device stops the communication on the given channel in response to the request;

prompting the transmitting terminal device and the receiving terminal device to resume the communication on the given channel based on the information stored, when the interrupting communication is terminated;

transmitting a signal to prompt the transmitting terminal device and the receiving terminal device to resume the communication, for a predetermined period of time since the communication unit terminates the communication; and stopping the transmitting the signal to prompt the transmitting terminal and the receiving terminal to resume the communication when a signal to reject resumption of the communication is received from the transmitting terminal device.

5. A communication method comprising:

performing, by a terminal device, communication on a given channel;

when a communication unit on the given channel is stopped in response to a request from a further terminal device for an interruption in the communication and then the further terminal device terminates interrupting communication, detecting a signal from the further terminal device to prompt the communication on the given channel to be stopped;

enabling the communication on the given channel while a signal to prompt the communication to be resumed is being detected; and notifying the further terminal device of rejection of resumption when the signal to prompt the terminal device to resume the communication is detected.

* * * * *